US012071290B2

(12) United States Patent
Thompson

(10) Patent No.: US 12,071,290 B2
(45) Date of Patent: Aug. 27, 2024

(54) CARRIER FOR CONTAINERS

(71) Applicant: Graphic Packaging International, LLC, Atlanta, GA (US)

(72) Inventor: Jon Thompson, Bristol (GB)

(73) Assignee: Graphic Packagin g International, LLC, Atlanta, GA (US)

( * ) Notice: Subject to any disclaimer, the term of this patent is extended or adjusted under 35 U.S.C. 154(b) by 0 days.

(21) Appl. No.: 17/864,590

(22) Filed: Jul. 14, 2022

(65) Prior Publication Data

US 2023/0015157 A1 Jan. 19, 2023

Related U.S. Application Data

(60) Provisional application No. 63/260,881, filed on Sep. 3, 2021, provisional application No. 63/222,225, filed on Jul. 15, 2021.

(51) Int. Cl.

| | |
|---|---|
| ***B65D 71/42*** | (2006.01) |
| ***B31B 50/73*** | (2017.01) |
| ***B31B 50/86*** | (2017.01) |
| ***B65D 71/44*** | (2006.01) |
| *B31B 105/00* | (2017.01) |

(52) U.S. Cl.

CPC ............ *B65D 71/42* (2013.01); *B31B 50/732* (2017.08); *B31B 50/86* (2017.08); *B65D 71/44* (2013.01); *B31B 2105/00* (2017.08); *B31B 2241/001* (2013.01); *B65D 2571/00141* (2013.01); *B65D 2571/0016* (2013.01);

(Continued)

(58) Field of Classification Search

CPC ... B31B 50/86; B31B 50/732; B31B 2105/00; B65D 71/42; B65D 71/44; B65D 71/46; B65D 71/50; B65D 2571/0016; B65D 2571/00296; B65D 2571/00444; B65D 2571/0066; B65D 71/48

USPC .................................................. 206/153, 158

See application file for complete search history.

(56) References Cited

U.S. PATENT DOCUMENTS

| | | | |
|---|---|---|---|
| 1,527,399 | A | 2/1925 | Davidson |
| 2,289,859 | A | 7/1942 | Arthur |

(Continued)

FOREIGN PATENT DOCUMENTS

| | | |
|---|---|---|
| AT | 399701 B | 7/1995 |
| CA | 2133827 | 10/1993 |

(Continued)

OTHER PUBLICATIONS

International Search Report and Written Opinion for PCT/US2022/037071 dated Nov. 2, 2022.

(Continued)

*Primary Examiner* — Bryon P Gehman

(74) *Attorney, Agent, or Firm* — Womble Bond Dickinson (US) LLP

(57) ABSTRACT

A carrier for holding a plurality of containers includes a front portion having a front attachment panel for at least partially receiving a respective container of the plurality of containers, a back portion having a back attachment panel for at least partially receiving a respective container of the plurality of containers, and a central portion extending from the front portion to the back portion, the central portion having a central panel overlapping a respective portion of each of the front attachment panel and the back attachment panel.

43 Claims, 8 Drawing Sheets

(52) U.S. Cl.
CPC .............. *B65D 2571/00296* (2013.01); *B65D 2571/00444* (2013.01); *B65D 2571/0066* (2013.01)

(56) References Cited

U.S. PATENT DOCUMENTS

| | | | | |
|---|---|---|---|---|
| 2,320,440 | A | 6/1943 | Kruea | |
| 2,331,038 | A | 10/1943 | Meller | |
| 2,397,376 | A | 3/1946 | Caldwell | |
| 2,397,716 | A | 4/1946 | Wendler | |
| 2,522,950 | A | 9/1950 | Keith | |
| 2,594,376 | A | 4/1952 | Arneson | |
| 2,594,377 | A | 4/1952 | Arneson | |
| 2,737,326 | A | 3/1956 | Toensmeier | |
| 2,798,603 | A | 7/1957 | Grinspoon | |
| 2,814,385 | A | 11/1957 | Stone | |
| 2,950,041 | A | 8/1960 | Stone | |
| 2,965,410 | A | 12/1960 | Hughes | |
| 3,001,647 | A | 9/1961 | Liss | |
| 3,005,654 | A | 10/1961 | Stone et al. | |
| 3,046,711 | A | 7/1962 | Harrison | |
| 3,061,141 | A | 10/1962 | Cote | |
| 3,094,210 | A | 6/1963 | Vsn Der Berg | |
| 3,099,475 | A | 7/1963 | Manizza | |
| 3,118,537 | A | 1/1964 | Copping | |
| 3,128,034 | A | 4/1964 | Weiss | |
| 3,137,109 | A | 6/1964 | Rapata | |
| 3,146,885 | A | 9/1964 | Grantham | |
| 3,156,358 | A | 11/1964 | Randrup | |
| 3,200,944 | A | 8/1965 | Rapata | |
| 3,223,308 | A | 12/1965 | Weiss | |
| 3,245,711 | A | 4/1966 | Dantoin | |
| 3,257,066 | A | 6/1966 | Williams | |
| 3,281,180 | A | 10/1966 | Spery | |
| 3,302,784 | A | 2/1967 | Copping | |
| 3,387,879 | A | 6/1968 | Wood | |
| 3,404,912 | A | 10/1968 | Watts | |
| 3,410,596 | A | 11/1968 | Slevin, Jr. | |
| 3,432,202 | A | 3/1969 | Ebelhardt | |
| 3,463,535 | A | 8/1969 | Beart | |
| 3,528,697 | A | 9/1970 | Wood | |
| 3,587,847 | A | 6/1971 | Graser | |
| 3,601,439 | A | 8/1971 | Poupitch | |
| 3,612,266 | A | 10/1971 | Graser | |
| D222,579 | S | 11/1971 | Oglesbee | |
| 3,627,121 | A | 12/1971 | Deasy | |
| 3,653,503 | A | 4/1972 | Arneson | |
| 3,693,787 | A | 9/1972 | Duerr | |
| 3,698,550 | A | 10/1972 | Graser | |
| 3,701,416 | A | 10/1972 | Lawrence | |
| 3,722,945 | A | 3/1973 | Wood | |
| 3,726,558 | A | 4/1973 | Klygis | |
| 3,734,278 | A | 5/1973 | Kerrigan | |
| 3,767,041 | A | 10/1973 | Graser | |
| 3,876,066 | A | 4/1975 | Klygis | |
| 3,897,873 | A | 8/1975 | Graser | |
| 3,924,739 | A | 12/1975 | Gravesteijn | |
| 3,942,631 | A | 3/1976 | Sutherland et al. | |
| 4,029,204 | A | 6/1977 | Manizza | |
| 4,078,357 | A | 3/1978 | Ida | |
| 4,111,298 | A | 9/1978 | Mascia | |
| 4,120,396 | A | 10/1978 | Mascia | |
| 4,136,772 | A | 1/1979 | Mascia | |
| 4,155,502 | A | 5/1979 | Forte | |
| 4,190,149 | A | 2/1980 | Oliff et al. | |
| 4,192,540 | A * | 3/1980 | Oliff | B65D 71/46 206/161 |
| D257,001 | S | 9/1980 | Oliff | |
| 4,244,617 | A | 1/1981 | Manizza | |
| 4,304,329 | A | 12/1981 | Graser | |
| D265,292 | S | 7/1982 | Killy | |
| 4,339,032 | A | 7/1982 | Wood | |
| D265,979 | S | 8/1982 | Arfert | |
| 4,372,599 | A | 2/1983 | Kiedaisch et al. | |
| 4,378,879 | A | 4/1983 | Killy | |
| 4,382,505 | A | 5/1983 | Sutherland et al. | |
| 4,441,611 | A | 4/1984 | Sommariva | |
| 4,453,630 | A | 6/1984 | Helms | |
| 4,471,870 | A | 9/1984 | Uhlig | |
| 4,523,676 | A | 6/1985 | Barrash | |
| 4,566,591 | A | 1/1986 | Turtschan | |
| 4,703,847 | A | 11/1987 | Oliff | |
| D294,331 | S | 2/1988 | Panazzolo | |
| 4,736,977 | A | 4/1988 | Killy | |
| 4,784,266 | A | 11/1988 | Chaussadas | |
| D304,017 | S | 10/1989 | Oliff | |
| 4,911,288 | A | 3/1990 | Dantoin, Jr. | |
| 4,974,726 | A | 12/1990 | Klygis et al. | |
| 5,002,225 | A | 3/1991 | Bienaime | |
| 5,065,862 | A | 11/1991 | Mousseau | |
| 5,103,971 | A | 4/1992 | Schuster | |
| 5,125,506 | A | 6/1992 | Galbierz et al. | |
| 5,135,104 | A | 8/1992 | Jorba | |
| 5,139,147 | A | 8/1992 | Sutherland | |
| D329,807 | S | 9/1992 | Heider | |
| 5,188,225 | A | 2/1993 | Jorba | |
| 5,193,673 | A | 3/1993 | Rathbone et al. | |
| 5,201,412 | A | 4/1993 | Schuster et al. | |
| 5,230,425 | A | 7/1993 | Edqvist et al. | |
| 5,246,113 | A | 9/1993 | Schuster | |
| 5,263,299 | A | 11/1993 | Galbierz et al. | |
| 5,267,644 | A | 12/1993 | Tsao | |
| 5,282,348 | A | 2/1994 | Dampier et al. | |
| 5,297,673 | A | 3/1994 | Sutherland | |
| 5,310,050 | A | 5/1994 | Sutherland | |
| 5,310,051 | A | 5/1994 | Sutherland | |
| 5,314,224 | A | 5/1994 | Bates | |
| 5,318,178 | A | 6/1994 | Davies et al. | |
| 5,323,895 | A | 6/1994 | Sutherland et al. | |
| 5,328,024 | A | 7/1994 | Sutherland | |
| 5,335,774 | A | 8/1994 | Ganz | |
| 5,351,815 | A | 10/1994 | Fogle et al. | |
| 5,351,816 | A | 10/1994 | Sutherland et al. | |
| 5,351,817 | A | 10/1994 | Sutherland | |
| 5,355,999 | A | 10/1994 | Sutherland | |
| 5,360,104 | A | 11/1994 | Sutherland | |
| 5,390,784 | A | 2/1995 | Sutherland | |
| 5,407,065 | A | 4/1995 | Sutherland | |
| 5,415,278 | A | 5/1995 | Sutherland | |
| 5,425,446 | A | 6/1995 | Weaver | |
| 5,443,153 | A | 8/1995 | Sutherland | |
| 5,445,262 | A | 8/1995 | Sutherland | |
| 5,452,799 | A | 9/1995 | Sutherland | |
| 5,469,687 | A | 11/1995 | Olson | |
| 5,484,053 | A | 1/1996 | Harris | |
| 5,485,914 | A | 1/1996 | Martin | |
| 5,487,464 | A | 1/1996 | Galbierz et al. | |
| 5,490,593 | A | 2/1996 | Gordon et al. | |
| 5,503,267 | A | 4/1996 | Sutherland | |
| 5,520,283 | A | 5/1996 | Sutherland | |
| 5,524,756 | A | 6/1996 | Sutherland | |
| 5,542,536 | A | 8/1996 | Sutherland | |
| 5,551,566 | A | 9/1996 | Sutherland | |
| 5,553,704 | A | 9/1996 | Gordon et al. | |
| 5,553,705 | A | 9/1996 | Bakx | |
| 5,573,111 | A | 11/1996 | Gordon | |
| 5,590,776 | A | 1/1997 | Galbierz | |
| 5,593,027 | A | 1/1997 | Sutherland | |
| 5,609,247 | A | 3/1997 | Appleton | |
| 5,609,251 | A | 3/1997 | Harris | |
| 5,609,379 | A | 3/1997 | Harrelson | |
| 5,639,137 | A | 6/1997 | Bakx | |
| 5,682,982 | A | 11/1997 | Stonehouse | |
| 5,706,936 | A | 1/1998 | Bernstein | |
| 5,711,419 | A | 1/1998 | Beales et al. | |
| 5,735,394 | A | 4/1998 | Harrelson | |
| 5,746,310 | A | 5/1998 | Slomski | |
| 5,762,193 | A | 6/1998 | Marco | |
| 5,791,463 | A | 8/1998 | Negelen | |
| 5,816,391 | A | 10/1998 | Harris | |
| 5,845,776 | A | 12/1998 | Galbierz et al. | |
| 5,878,876 | A | 3/1999 | Galbierz et al. | |
| 5,960,945 | A | 10/1999 | Sutherland | |
| 6,039,181 | A | 3/2000 | Whiteside | |

(56) References Cited

U.S. PATENT DOCUMENTS

| | | | | |
|---|---|---|---|---|
| 6,059,099 | A | 5/2000 | Galbierz | |
| 6,082,532 | A | 7/2000 | Miess | |
| 6,145,656 | A | 11/2000 | Marco | |
| 6,293,392 | B1 | 9/2001 | Galbierz | |
| 6,315,111 | B1 | 11/2001 | Sutherland | |
| 6,394,272 | B1 | 5/2002 | Domansky | |
| 6,896,130 | B2 | 5/2005 | Theelen | |
| D506,925 | S | 7/2005 | Plumer | |
| 7,011,209 | B2 | 3/2006 | Sutherland et al. | |
| 7,048,113 | B2 | 5/2006 | Gomes | |
| 7,360,647 | B2 | 4/2008 | Ogg | |
| 7,690,507 | B2 | 4/2010 | Sutherland | |
| 7,721,878 | B2 | 5/2010 | Requena | |
| 7,762,397 | B2 | 7/2010 | Coltri-Johnson et al. | |
| 7,789,231 | B2 | 9/2010 | Requena | |
| 7,823,721 | B2 | 11/2010 | Sutherland et al. | |
| 7,913,844 | B2 | 3/2011 | Spivey, Sr. | |
| 8,056,709 | B2 | 11/2011 | Sutherland | |
| 8,096,413 | B2 | 1/2012 | DePaula | |
| 8,162,135 | B2 | 4/2012 | Oliveira | |
| 8,353,398 | B2 | 1/2013 | DePaula et al. | |
| 8,387,784 | B2 | 3/2013 | Gonzalez et al. | |
| 8,443,968 | B2 | 5/2013 | DePaula | |
| 8,464,866 | B2 | 6/2013 | Sutherland et al. | |
| 8,469,184 | B2 | 6/2013 | Spivey, Sr. | |
| 8,602,209 | B2 | 12/2013 | Jones et al. | |
| 8,631,932 | B2 | 1/2014 | Holley, Jr. | |
| 8,701,878 | B2 | 4/2014 | Spivey, Sr. | |
| 8,925,720 | B2 | 1/2015 | Sutherland et al. | |
| 8,936,149 | B2 | 1/2015 | Smalley | |
| 8,955,674 | B2 | 2/2015 | Spivey, Sr. et al. | |
| 9,079,699 | B2 | 7/2015 | Holley, Jr. | |
| 9,169,050 | B2 | 10/2015 | Spivey, Sr. | |
| 9,284,090 | B2 | 3/2016 | Lettre | |
| 9,359,093 | B2 | 6/2016 | DePaula et al. | |
| 9,376,250 | B2 | 6/2016 | Spivey, Sr. | |
| D767,408 | S | 9/2016 | Shuster | |
| 9,446,891 | B2 | 9/2016 | Jones et al. | |
| 9,511,916 | B2 | 12/2016 | Holley, Jr. | |
| 9,669,976 | B2 | 6/2017 | Kastanek et al. | |
| 9,676,535 | B2 | 6/2017 | Spivey, Sr | |
| 10,077,131 | B2 | 9/2018 | Lettre | |
| D881,021 | S | 4/2020 | Bandinu | |
| D881,718 | S | 4/2020 | Bandinu | |
| 10,836,550 | B2 | 11/2020 | Zacherle | |
| D918,057 | S | 5/2021 | L'Heureux | |
| D918,058 | S | 5/2021 | L'Heureux | |
| 11,014,727 | B2 | 5/2021 | McCree | |
| D920,809 | S | 6/2021 | Chesnet et al. | |
| D921,493 | S | 6/2021 | Chesnet | |
| D923,416 | S | 6/2021 | Luciano | |
| 11,027,904 | B2 * | 6/2021 | McCree ................. | B65D 71/42 |
| 11,027,905 | B2 | 6/2021 | Ford | |
| 11,180,301 | B2 | 11/2021 | Smalley | |
| D944,656 | S | 3/2022 | Spivey, Sr. | |
| D946,416 | S | 3/2022 | Smalley | |
| D946,417 | S | 3/2022 | Gonzalez Manzano | |
| D946,418 | S | 3/2022 | Gonzalez Manzano | |
| D946,419 | S | 3/2022 | Gonzalez Manzano | |
| D946,420 | S | 3/2022 | Gonzalez Manzano | |
| D946,421 | S | 3/2022 | Gonzalez Manzano | |
| 11,261,013 | B2 | 3/2022 | Smalley | |
| 11,286,094 | B2 | 3/2022 | Gonzalez Manzano | |
| D955,889 | S | 6/2022 | Gonzalez Manzano | |
| D955,890 | S | 6/2022 | Gonzalez Manzano | |
| D956,574 | S | 7/2022 | Gonzalez Manzano | |
| 11,401,094 | B2 * | 8/2022 | McCree ................. | B65D 71/42 |
| 11,401,095 | B2 | 8/2022 | Rosenbrien | |
| 11,420,802 | B2 | 8/2022 | Kooc | |
| D962,789 | S | 9/2022 | Noel | |
| 11,628,994 | B2 | 4/2023 | McCree | |
| 2002/0195371 | A1 | 12/2002 | Brown | |
| 2003/0080004 | A1 | 5/2003 | Olsen et al. | |
| 2003/0213705 | A1 | 11/2003 | Woog | |
| 2004/0206639 | A1 | 10/2004 | Karlsson | |
| 2004/0211695 | A1 | 10/2004 | Karlsson | |
| 2004/0226833 | A1 | 11/2004 | Daniel | |
| 2005/0127151 | A1 | 6/2005 | Johnson | |
| 2005/0199513 | A1 | 9/2005 | Bakx et al. | |
| 2006/0255114 | A1 | 11/2006 | Hand et al. | |
| 2007/0080084 | A1 | 4/2007 | Sutherland | |
| 2007/0163908 | A1 | 7/2007 | Sutherland | |
| 2008/0257763 | A1 | 10/2008 | Ogg | |
| 2009/0101526 | A1 | 4/2009 | Sutherland et al. | |
| 2009/0127147 | A1 | 5/2009 | Sutherland | |
| 2010/0078337 | A1 | 4/2010 | Sutherland et al. | |
| 2010/0264043 | A1 | 10/2010 | DePaula | |
| 2011/0000799 | A1 | 1/2011 | Gonzalez | |
| 2012/0080328 | A1 | 4/2012 | DePaula | |
| 2012/0138489 | A1 | 6/2012 | Holley, Jr. | |
| 2015/0191287 | A1 | 7/2015 | L'Heureux et al. | |
| 2016/0325899 | A1 | 11/2016 | L'Heureux et al. | |
| 2018/0111734 | A1 | 4/2018 | Jego | |
| 2018/0222650 | A1 | 8/2018 | Zacherle | |
| 2018/0362234 | A1 | 12/2018 | L'Heureux et al. | |
| 2019/0119019 | A1 | 4/2019 | Patton | |
| 2020/0010255 | A1 | 1/2020 | Zacherle et al. | |
| 2020/0079564 | A1 | 3/2020 | Ford | |
| 2020/0189817 | A1 | 6/2020 | Smalley | |
| 2020/0189818 | A1 | 6/2020 | McCree | |
| 2020/0189819 | A1 | 6/2020 | McCree | |
| 2020/0189821 | A1 | 6/2020 | Smalley | |
| 2020/0189822 | A1 | 6/2020 | Smalley | |
| 2020/0223612 | A1 | 7/2020 | Swenson | |
| 2021/0061502 | A1 | 3/2021 | Johnston | |
| 2021/0094742 | A1 | 4/2021 | Gonzalez Manzano | |
| 2021/0276776 | A1 | 9/2021 | Zammit | |
| 2021/0316921 | A1 | 10/2021 | Holtz | |
| 2021/0331847 | A1 | 10/2021 | Gonzalez Manzano | |
| 2021/0331848 | A1 | 10/2021 | Gonzalez Manzano | |
| 2021/0339928 | A1 | 11/2021 | Blin | |
| 2022/0009685 | A1 | 1/2022 | Thompson | |
| 2022/0097941 | A1 | 3/2022 | McCree | |

FOREIGN PATENT DOCUMENTS

| | | | |
|---|---|---|---|
| DE | 298 13 672 | U1 | 11/1998 |
| DE | 203 19 247 | U1 | 5/2004 |
| DE | 10 2009 059 047 | A1 | 6/2011 |
| EP | 0 051 413 | A1 | 5/1982 |
| EP | 0 060 504 | A2 | 9/1982 |
| EP | 0 057 437 | B1 | 5/1985 |
| EP | 0 496 807 | | 6/1993 |
| EP | 0 636 096 | | 2/1995 |
| EP | 0 715 593 | A1 | 6/1996 |
| EP | 0 398 835 | B1 | 10/1996 |
| EP | 1340691 | A1 | 9/2003 |
| EP | 1 401 727 | B1 | 6/2006 |
| EP | 1 910 187 | B1 | 3/2009 |
| EP | 2 067 713 | A1 | 6/2009 |
| EP | 1 528 007 | B1 | 10/2010 |
| EP | 2739547 | B1 | 7/2017 |
| EP | 3 666 684 | A1 | 6/2020 |
| EP | 3 666 685 | A1 | 6/2020 |
| FR | 2 737 196 | A1 | 1/1997 |
| GB | 1 256 684 | | 12/1971 |
| GB | 2 221 666 | A | 2/1990 |
| GB | 2 321 229 | A | 7/1998 |
| GB | 9006736716 | | 8/2019 |
| GB | 2591535 | A | 8/2021 |
| GB | 6161591 | | 9/2021 |
| JP | 37-15730 | | 9/1960 |
| JP | 10-194330 | A | 7/1998 |
| JP | 10-297668 | A | 11/1998 |
| JP | 11-193059 | A | 7/1999 |
| JP | 2001-519300 | A | 10/2001 |
| JP | 2003-146359 | | 5/2003 |
| JP | 2004-189243 | A | 7/2004 |
| JP | 2015-048088 | A | 3/2015 |
| JP | 2016-124605 | | 7/2016 |
| KR | 10-2005-0051616 | A | 6/2005 |
| KR | 10-2020-0106806 | A | 9/2020 |
| KR | 301130233 | | 10/2021 |
| WO | WO 91/05716 | A1 | 5/1991 |

(56) References Cited

FOREIGN PATENT DOCUMENTS

| | | | |
|---|---|---|---|
| WO | WO 93/02941 | | 2/1993 |
| WO | WO 93/02941 | A1 | 2/1993 |
| WO | WO 93/21083 | | 10/1993 |
| WO | WO 93/25439 | A1 | 12/1993 |
| WO | WO 94/22738 | A1 | 10/1994 |
| WO | WO 95/01289 | A1 | 1/1995 |
| WO | WO 95/06604 | | 3/1995 |
| WO | WO 95/10459 | A1 | 4/1995 |
| WO | WO 95/22495 | A1 | 8/1995 |
| WO | WO 96/26128 | A1 | 8/1996 |
| WO | WO 96/32340 | A1 | 10/1996 |
| WO | WO 03/016167 | A1 | 2/2003 |
| WO | WO 2006/044583 | A2 | 4/2006 |
| WO | WO 2008/058294 | A1 | 5/2008 |
| WO | WO 2010/006629 | A1 | 1/2010 |
| WO | WO 2010/101852 | A1 | 9/2010 |
| WO | WO 2016/100010 | A1 | 6/2016 |
| WO | WO 2016/112145 | A1 | 7/2016 |
| WO | WO 2020/210562 | A1 | 10/2020 |
| WO | WO 2021/038516 | A1 | 3/2021 |
| WO | WO 2021/168417 | A1 | 8/2021 |
| WO | WO 2021/188751 | A1 | 9/2021 |
| WO | WO 2021/262858 | A1 | 12/2021 |

OTHER PUBLICATIONS

"Florida brewery unveils six-pack rings that spare sea turtles, not snare them," by Thomas Leavy, CBSNews.com. Date posted: May 24, 2018. Site visited: Sep. 12, 2022. Available online: https://www.cbsnews.com/news/ florida-saltwater-brewery-non-plastic-six-pack-rings-spare-sea-turtles/ (Year: 2018).

"Pepsi trials molded pulp alternative to plastic rings" in BeverageDaily.com. Date posted: Feb. 28, 2020. Site visited: Sep. 12, 2022. Available online: https://www.beveragedaily.com/Article/2020/02/28/Pepsi-trials-molded-pulp-alternative-to-plastic-rings# (Year: 2020).

Enviroclip. Date posted: 2022. Site visited: Sep. 12, 2022. Available online: https://www.graphicpkg.com/products/enviroclip/ (Year: 2022).

"Paperboard Can Handle Applicator," as seen in Packaging World Online. Date first available: 2020. Site visited: Sep. 13, 2022. Available online: https://www.packworld.com/news/sustainability/article/21202650/paperboard-can-handle-applicator (Year: 2020).

"The 'ECOGRIP' Corrugated Bottle Carrier is a Plastic Alternative" in Trendhunter.com. Date published: Jan. 20, 2021. Site visited: Sep. 12, 2022. Available online: https://www.trendhunter.com/trends/corrugated-bottle-carrier (Year: 2021).

Cap-it packaging video on Vimeo. Date posted: 2021. Site visited: Sep. 19, 2022. Available online: https://vimeo.com/610619455?embedded=true&source=vimeo_logo&owner=24551687 (Year: 2021).

2020 Package of the Year and Innovation of the Year on YouTube. Date posted: Oct. 19, 2020. Site visited: Sep. 12, 2022. Available online: https://www.youtube.com/watch?v=wxwpM4hodFA (Year: 2020).

International Search Report and Written Opinion for PCT/US2022/032608 dated Sep. 28, 2022.

International Search Report and Written Opinion for PCT/US2022/035207 dated Oct. 14, 2022.

International Search Report and Written Opinion for PCT/US2022/034840 dated Oct. 21, 2022.

International Search Report and Written Opinion for PCT/US2022/036297 dated Oct. 21, 2022.

International Search Report and Written Opinion for PCT/US2022/038638 dated Nov. 8, 2022.

International Search Report and Written Opinion for PCT/US2022/037069 dated Oct. 28, 2022.

* cited by examiner

CARRIER FOR CONTAINERS

CROSS-REFERENCE TO RELATED APPLICATIONS

This application claims the benefit of each of U.S. Provisional Patent Application No. 63/222,225, filed on Jul. 15, 2021, and U.S. Provisional Patent Application No. 63/260,881, filed on Sep. 3, 2021.

INCORPORATION BY REFERENCE

The disclosures of each of U.S. Provisional Patent Application No. 63/222,225, filed on Jul. 15, 2021, U.S. Provisional Patent Application No. 63/260,881, filed on Sep. 3, 2021, and U.S. Design patent application Ser. No. 29/838,186, filed on May 11, 2022 are hereby incorporated by reference for all purposes as if presented herein in their entirety.

BACKGROUND OF THE DISCLOSURE

The present disclosure generally relates to cartons or carriers for holding, displaying, and/or transporting containers.

SUMMARY OF THE DISCLOSURE

According to one aspect, the disclosure is generally directed to a carrier for holding a plurality of containers, the carrier comprising a front portion comprising a front attachment panel for at least partially receiving a respective container of the plurality of containers, a back portion comprising a back attachment panel for at least partially receiving a respective container of the plurality of containers, and a central portion extending from the front portion to the back portion, the central portion comprising a central panel overlapping a respective portion of each of the front attachment panel and the back attachment panel.

According to another aspect, the disclosure is generally directed to a blank for forming a carrier for holding a plurality of containers, the blank comprising a front portion comprising a front attachment panel for at least partially receiving a respective container of the plurality of containers, a back portion comprising a back attachment panel for at least partially receiving a respective container of the plurality of containers, and a central portion extending from the front portion to the back portion, the central portion comprising a central panel for overlapping a respective portion of each of the front attachment panel and the back attachment panel when the carrier is formed from the blank.

According to another aspect, the disclosure is generally directed to a method of forming a carrier for holding a plurality of containers, the method comprising obtaining a blank comprising a front portion comprising a front attachment panel, a back portion comprising a back attachment panel, and a central portion for extending from the front portion to the back portion. The method further comprises positioning the front attachment panel for at least partially receiving a respective container of the plurality of containers, positioning the back attachment panel for at least partially receiving a respective container of the plurality of containers, and positioning the central panel overlapping a respective portion of each of the front attachment panel and the back attachment panel.

According to another aspect, the disclosure is generally directed to a package, the package comprising a plurality of containers and a carrier holding the plurality of containers. The carrier comprises a front portion comprising a front attachment panel at least partially receiving a respective container of the plurality of containers, a back portion comprising a back attachment panel at least partially receiving a respective container of the plurality of containers, and a central portion extending from the front portion to the back portion, the central portion comprising a central panel overlapping a respective portion of each of the front attachment panel and the back attachment panel.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to carriers, packages, constructs, sleeves, cartons, or the like, for holding and displaying containers such as jars, bottles, cans, etc. The containers can be used for packaging food and beverage products, for example. The containers can be made from materials suitable in composition for packaging the particular food or beverage item, and the materials include, but are not limited to, glass; plastics such as PET, LDPE, LLDPE, HDPE, PP, PS, PVC, EVOH, and Nylon; and the like; aluminum and/or other metals; or any combination thereof.

Carriers according to the present disclosure can accommodate containers of numerous different shapes. For the purpose of illustration and not for the purpose of limiting the scope of the disclosure, the following detailed description describes beverage containers (e.g., aluminum cans) at least partially disposed within the carrier embodiments. In this specification, the terms “lower,” “bottom,” “upper,” “top,” “front,” and “back” indicate orientations determined in relation to fully erected carriers.

As described herein, carriers may be formed by multiple overlapping panels, end flaps, and/or other portions of blanks. Such panels, end flaps, and/or other portions of the blank can be designated in relative terms to one another, e.g., “first”, “second”, “third”, etc., in sequential or non-sequential reference, without departing from the disclosure.

Figure 1:
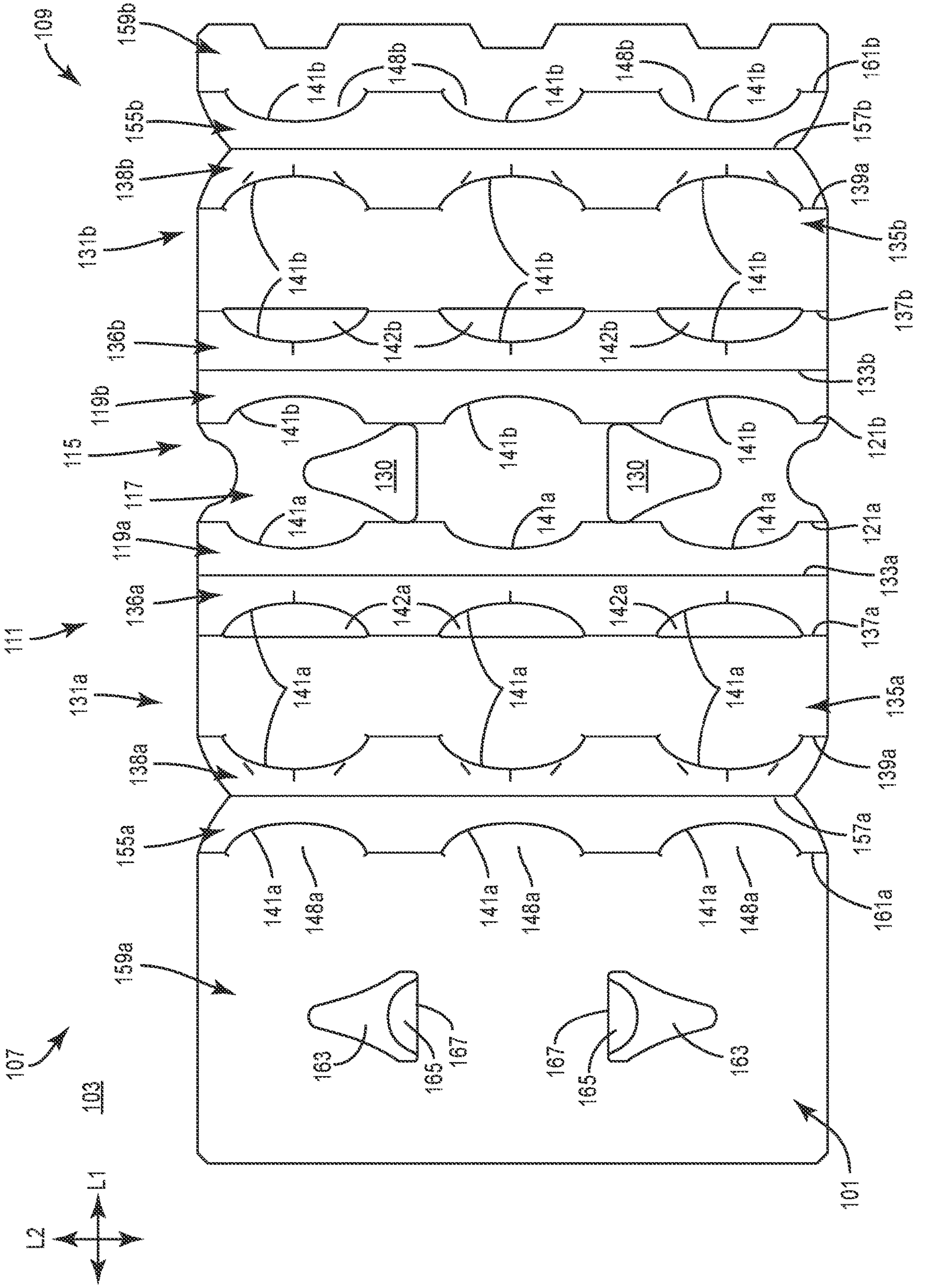
FIG. 1 is a plan view of an outer surface of a blank for forming a carrier and package according to a first exemplary embodiment of the disclosure.
Figure 2:
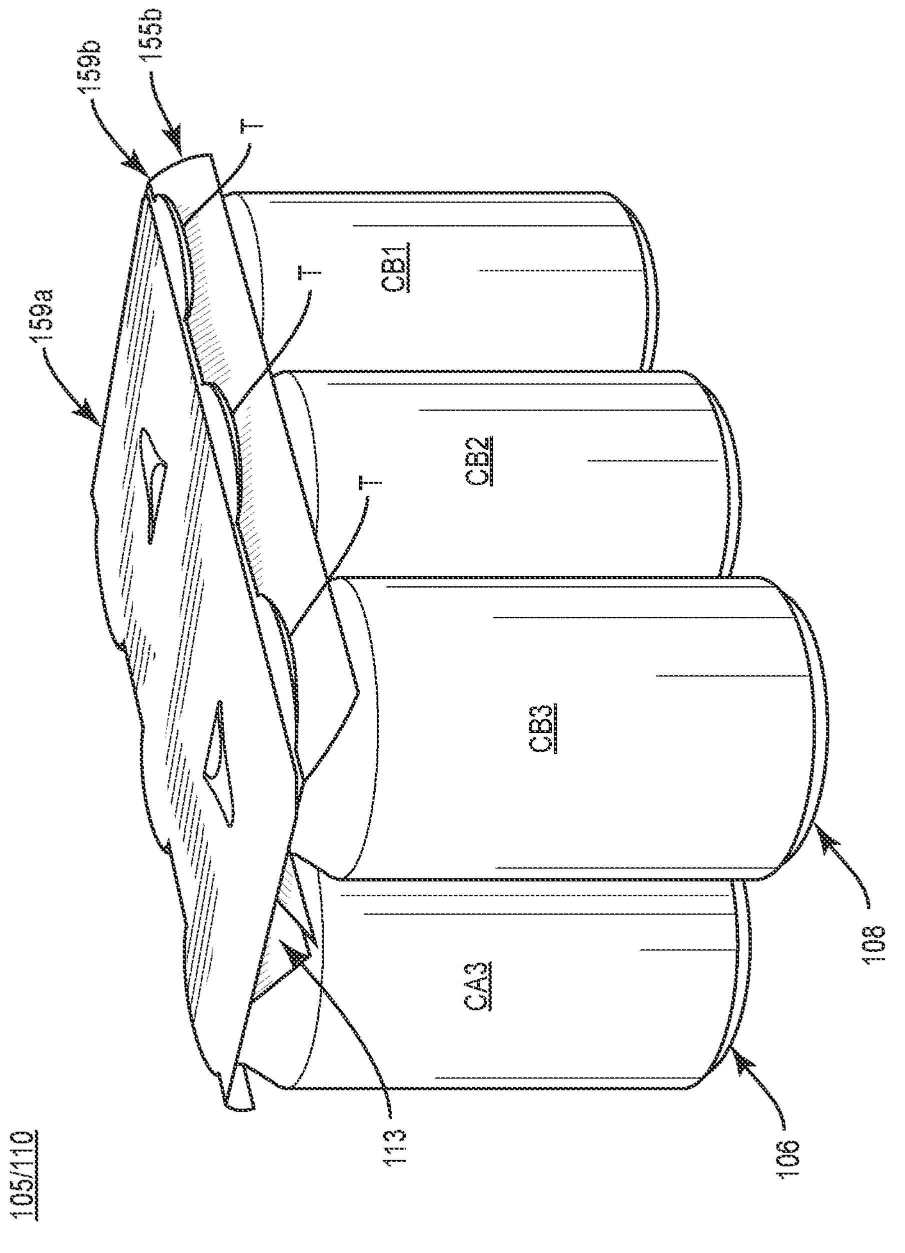
FIG. 2 is a perspective view of a package and carrier formed from the blank of FIG. 1 according to the first exemplary embodiment.

FIG. 1 shows a plan view of an exterior side 101 of a blank 103 used to form a carrier 105 (FIG. 2) in accordance with a first exemplary embodiment of the disclosure. As shown in FIG. 2, the carrier 105 is sized to contain or support six containers, with three containers CA1, CA2, CA3 being attached to a front portion 106 of the carrier 105 and three containers CB1, CB2, CB3 being attached to a back portion 108 of the carrier 105. In the illustrated embodiment, the containers CA1, CA2, CA3, CB1, CB2, CB3 can be beverage cans, or could be any other suitable type and size of container without departing from the disclosure.

The carrier 105 can be sized and shaped to hold more or less than six containers. In one embodiment, the front portion 106 and the back portion 108 of the carrier 105 each have three containers, and in other embodiments, the front portion 106 and or the back portion 108 of the carrier 105 can carry more or less than three containers without departing from the disclosure. The carrier 105 can be provided together with one or more containers as a package 110 (FIG. 2).

As shown in FIG. 1, the blank 103 has a longitudinal axis L1 and a lateral axis L2. The blank 103 has a front portion 107 for forming the front portion 106 of the carrier 105, a back portion 109 for forming the back portion 108 of the carrier 105, and a central or connection portion 111 for forming a central or connection portion 113 of the carrier 105. Accordingly, the central portion 111 of the blank 103/central portion 113 of the carrier 105 can extend from the front portion 107 of the blank 103/front portion 106 of the carrier 105 to the back portion 109 of the blank 103/back portion 108 of the carrier 105. In some embodiments, the central portion 111 of the blank 103/central portion 113 of the carrier 105 can be distinct from the front portion 107/106 and the back portion 109/108 or can form at least a portion of the front portion 107/106 and/or the back portion 109/108.

In the illustrated embodiment, the central portion 111 of the blank 103 includes a central panel 115 having a connection portion 117 foldably connected to a front reinforcement portion 119*a* at a lateral fold line 121*a* that is interrupted by a plurality of laterally-spaced cuts 141*a* that can each include one or more curved and/or angled portions. As described further herein, the central panel 115 also includes a back reinforcement portion 119*b* foldably connected to the connection portion 117 of the central panel 115 at a lateral fold line 121*b*. In some embodiments, the cuts 141 extending along the central panel 115 can at least partially define one or more tabs that can separate from the remainder of the central panel 115 upon formation of the carrier 105 to be positioned over respective containers.

As also shown, the central panel 115 includes a laterally-spaced pair of handle apertures 130 positioned in the connection portion 117 intersecting the respective fold lines 121*a*, 121*b*. As shown, the handle apertures 130 can have a generally rounded triangular/delta-shaped profile, though the handle apertures 130 can have a different configuration without departing from the disclosure.

With continued reference to FIG. 1, the front portion 107 of the blank 103 can include a front container retention panel or front attachment panel 131*a* foldably connected to the reinforcement portion 119*a* of the central panel 115 at a lateral fold line 133*a*.

Figure 1A:
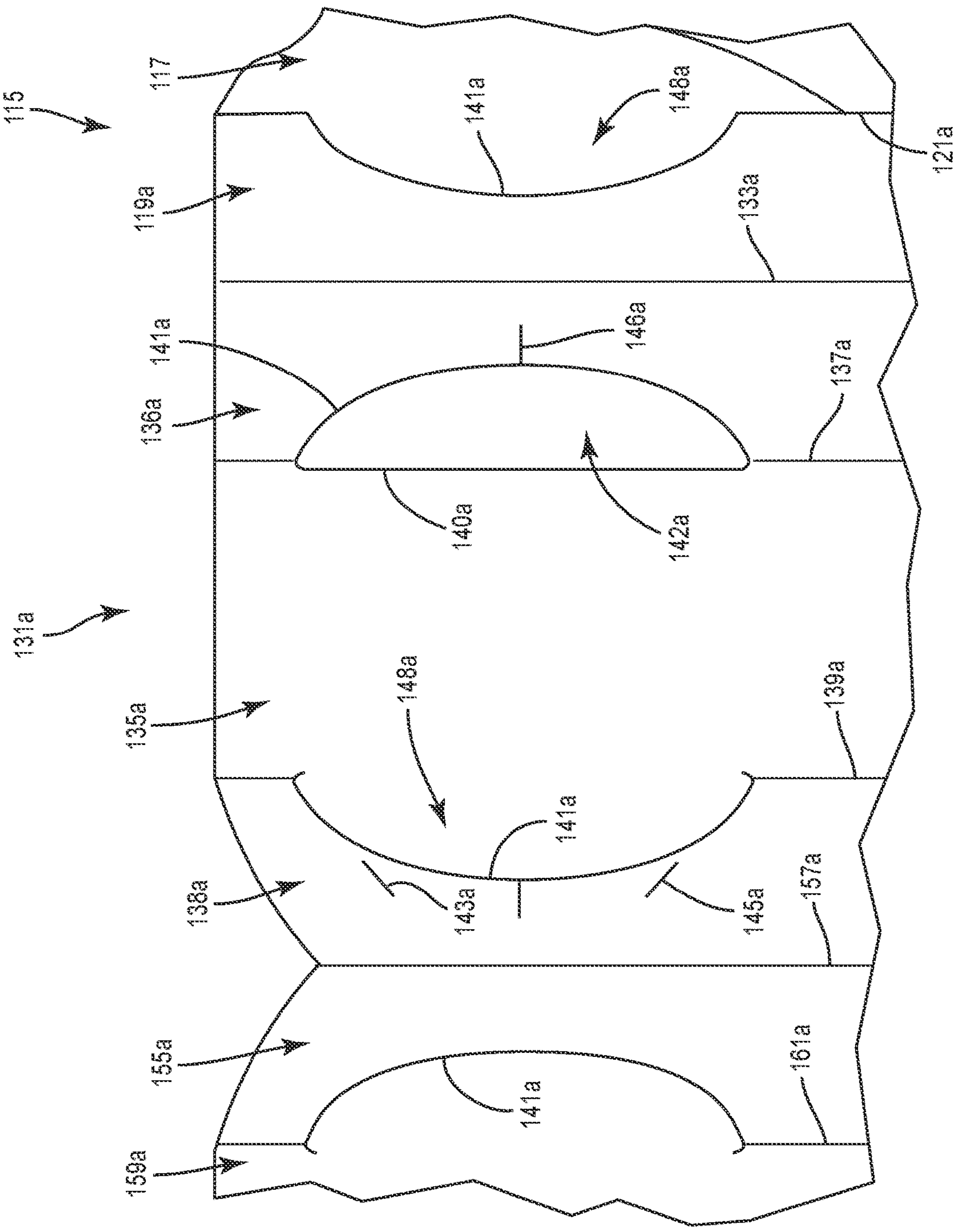
FIG. 1A is an enlarged view of a portion of the blank of FIG. 1.

With additional reference to the enlarged view of FIG. 1A, the front attachment panel 131*a* can also include a container retention portion 135*a* that is at least partially defined between a pair of longitudinally-spaced lateral fold lines 137*a*, 139*a* that are each interrupted by a respective plurality of laterally-spaced cuts 141*a* that can each include one or more curved and/or angled portions.

As shown, the laterally-spaced cuts 141*a* interrupting the fold line 139*a* define container retention tabs 148*a* that extend outwardly from the container retention portion 135*a*. As also shown, respective oblique cuts 143*a*, 145*a* can extend outwardly from one or more cuts 141*a* that interrupt the fold line 139*a*. Furthermore, longitudinal cuts 146*a* can extend outwardly from respective central portions of the cuts 141*a*.

As also shown, the curved cuts 141*a* interrupting the fold line 137*a* can intersect lateral cuts 140*a* having a generally enclosed profile, e.g., a semicircular profile or another fractionally circular profile at least partially defined by a minor arc, to define generally semicircular openings 142*a* in the attachment panel 131*a*.

In the aforementioned arrangement, an interior marginal portion 136*a* of the attachment panel 131*a* can defined between the fold lines 137*a*, 133*a*, and an exterior marginal portion 138*a* of the attachment panel 131*a* is defined between the fold line 139*a* and a lateral fold line 157*a* adjacent the attachment panel 131*a*. In this regard, the interior marginal portion 136*a* of the attachment panel 131*a* is foldably connected to the front reinforcement portion 119*a* of the central panel 115 at the lateral fold lines 133*a*.

A bevel or front side panel 155*a*, as shown, is foldably connected to the front attachment panel 131*a* at the lateral fold line 157*a*, and a top panel 159*a* is foldably connected to the front side panel 155*a* at a lateral fold line 161*a*. The lateral fold line 161*a* can be interrupted by a plurality of the cuts 141*a* so as to define container retention tabs 148*a* protruding from the top panel 159*a*, as described further herein.

The top panel 159*a*, as shown, includes a pair of laterally-spaced handle openings 163 that are for being generally aligned with the respective handle apertures 130. A respective handle reinforcement flap 165 can be foldably connected to the top panel 159*a* at respective longitudinal fold lines 167 and positioned to extend into the respective handle openings 163.

Figure 1B:
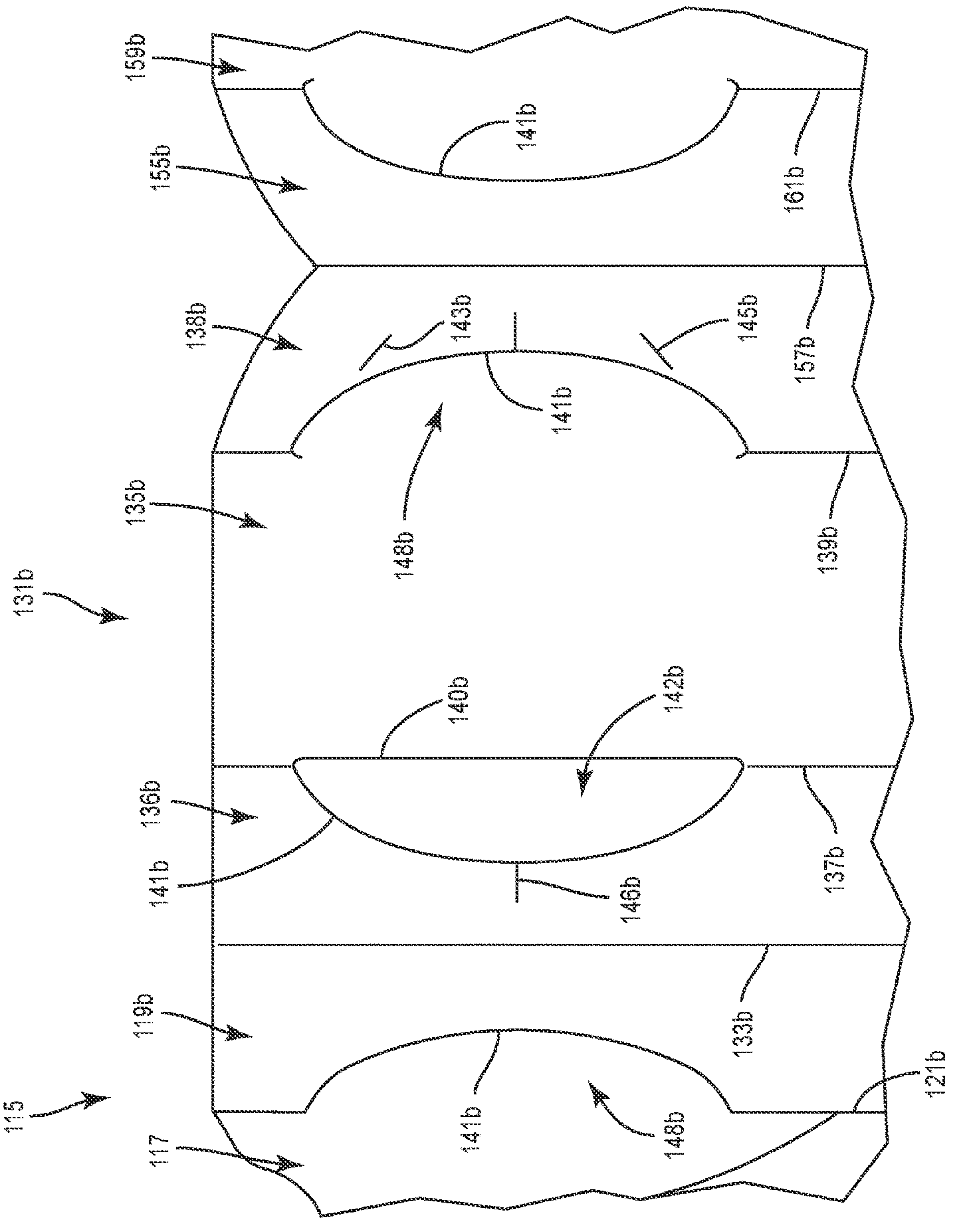
FIG. 1B is an enlarged view of another portion of the blank of FIG. 1.

In the illustrated embodiment, the back portion 109 of the blank 103 includes a back container retention panel or back attachment panel 131*b*, a back side panel 155*b*, and a back top panel or back attachment flap 159*b* having associated features that are generally a mirror-image of the corresponding portions of the front portion 107 of the blank 103. Corresponding components (e.g., panels, flaps, fold lines, cuts, etc.) have been designated by corresponding reference numbers that differ by the “a” or “b” suffix, with the “a” components corresponding to the front portion 107 of the blank 103 and the “b” components corresponding to the back portion 109 of the blank 103. An enlarged view of the container retention features of the back portion 109 of the blank 103 is illustrated in FIG. 1B.

Any of the panels, flaps, fold lines, cuts, or other features could be otherwise shaped, arranged, and/or omitted from the blank 103 without departing from the disclosure. The blank 103 could be sized and/or shaped to accommodate more or less than six containers without departing from this disclosure.

Figure 3:
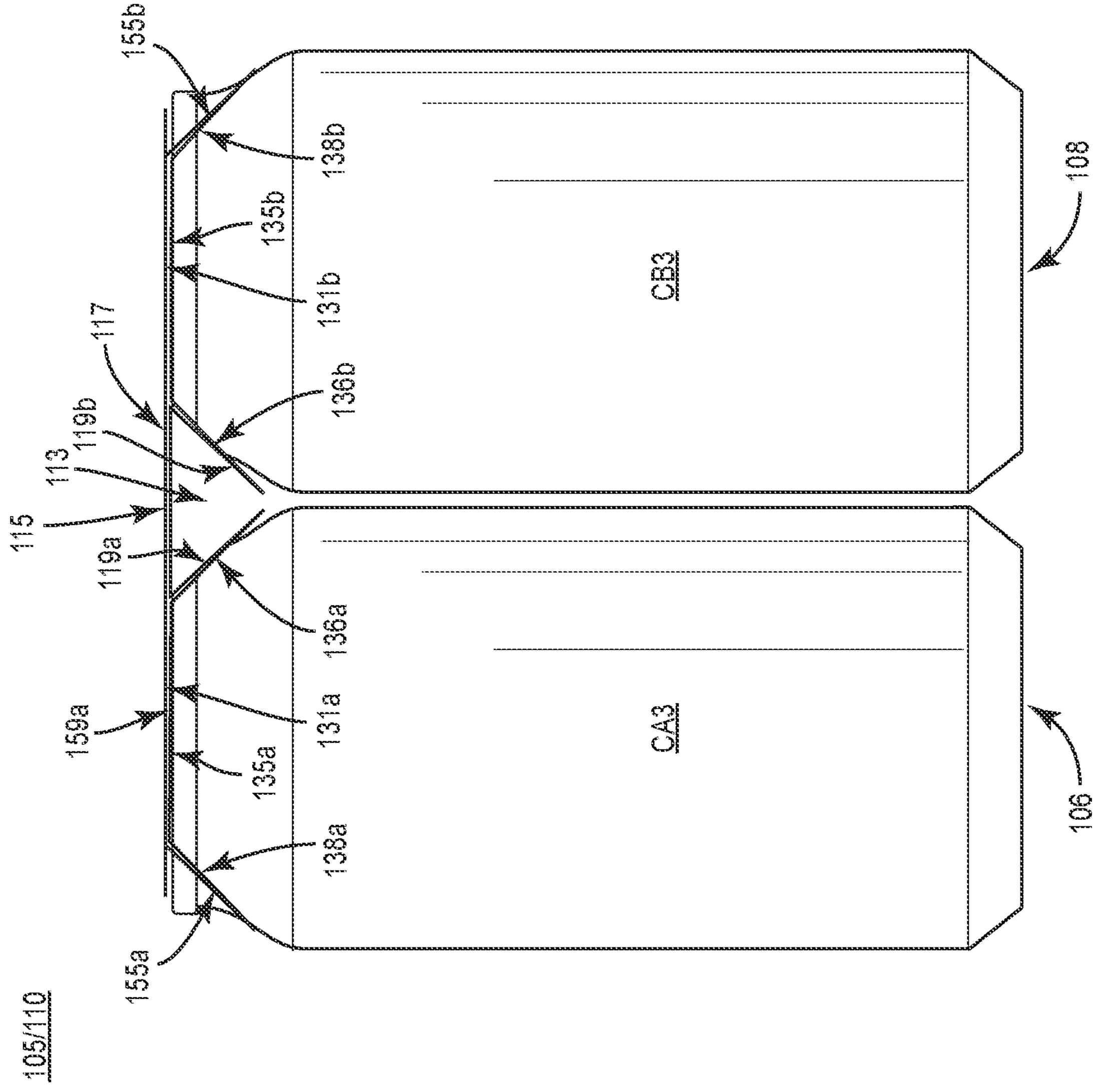
FIG. 3 is a side view of the package and carrier of FIG. 2.
Figure 4:
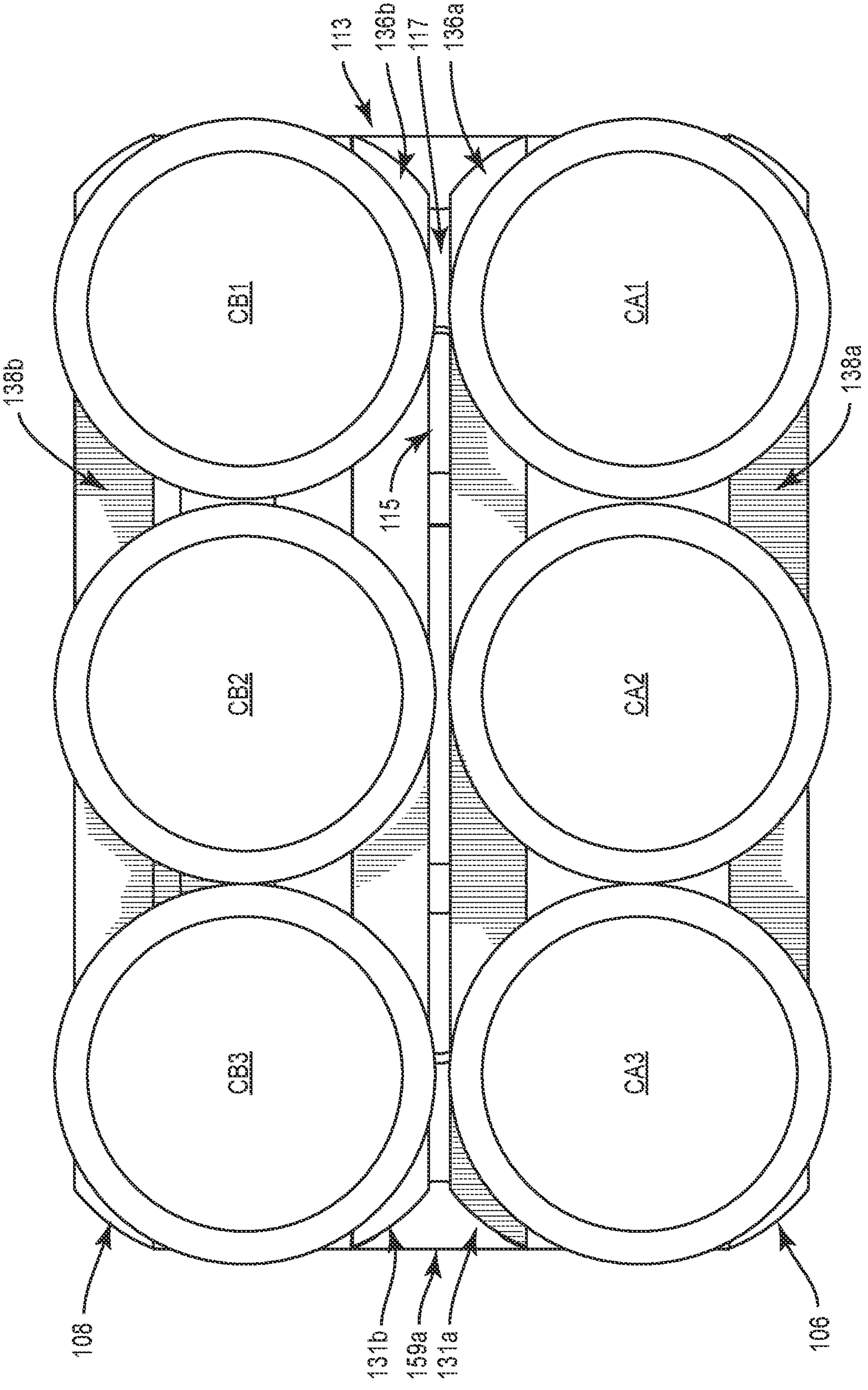
FIG. 4 is a bottom plan view of the package and carrier of FIG. 2.

Turning to FIGS. 2-4, the blank 103 can be inverted such that the exterior surface 101 of the blank 103 can be placed atop the containers CA1, CA2, CA3, CB1, CB2, CB3 such that the container retention portion 135*a* of the front attachment panel 131*a* overlies the containers CA1, CA2, CA3 and such that the container retention portion 135*b* of the back attachment panel 131*b* overlies the containers CB1, CB2, CB3. Further downward positioning of the attachment panels 131*a*, 131*b* over the plurality of containers CA1, CA2, CA3, CB1, CB2, CB3 can activate the respective container retention portions 135*a*, 135*b* to engage respective containers.

For example, as the front attachment panel 131*a* is lowered or urged downwardly onto the containers CA1, CA2, CA3 the container retention portion 135*a* can at least partially separate from the remainder of the front attachment panel 131*a* at the cuts 141*a* interrupting the fold line 139*a* such that the container retention tabs 148*a* can sit within recessed portions of the containers CA1, CA2, CA3, e.g., recessed tops of the containers CA1, CA2, CA3 below rolled upper rims thereof. In such an arrangement, upper or top portions T of the respective containers CA1, CA2, CA3 can extend at least partially through respective openings formed by the respective cuts 141*a* interrupting the fold line 139*a* as well as through the openings 142*a* interrupting the fold line 137*a*.

The marginal portions 136*a*, 138*a* of the attachment panel 131*a* can fold at least partially downwardly at the respective fold lines 137*a*, 139*a* in such a configuration, and such movement can cause reconfiguration of the outer marginal portion 138*a* of the top attachment panel 131*a* to reconfigure at the respective cuts 143*a*, 145*a*, 146*a* to engage a rolled rim or other top structure of the respective containers CA1, CA2, CA3.

The back attachment panel 131*b* and corresponding container retention portion 135*b* can engage the containers CB1, CB2, CB3 in a similar manner as described above with respect to the engagement of the front attachment panel 131*a* and container retention portion 135*a* with respect to the containers CA1, CA2, CA3.

The aforementioned engagement of the blank 103 with the containers CA1, CA2, CA3, CB1, CB2, CB3 can occur with the front row of containers CA1, CA2, CA3 spaced apart from the back row of containers CB1, CB2, CB3. Upon moving these rows of containers together, the front reinforcement portion 119*a* of the central panel 115 can fold downwardly at the fold line 121*a* relative to the connection portion 117 of the central panel 115, and can further fold at the fold line 133*a* into at least partial face-to-face contact with the interior marginal portion 136*a* of the attachment panel 131*a*.

Similarly, the back reinforcement portion 119*b* of the central panel 115 can fold downwardly at the fold line 121*b* relative to the connection portion 117 of the central panel 115, and can further fold at the fold line 133*b* into at least partial face-to-face contact with the interior marginal portion 136*b* of the attachment panel 131*b*. In such arrangement, portions of the connection portion 117 of the central panel 115 can separate from the reinforcement portions 119*a*, 119*b* at the respective cuts 141*a*, 141*b* and can be positioned to at least partially overlie the openings 142*a*, 142*b* in the respective attachment panels 131*a*, 131*b*.

The aforementioned arrangement of the reinforcement portion 119*a* of the central panel 115 with the interior marginal portion 136*a* of the attachment panel 131*a* and the reinforcement portion 119*b* of the central panel 115 with the interior marginal portion 136*b* of the attachment panel 131*b* can provide a reinforcing structure that is resistant to tearing, bending, bowing, twisting, other deformation, etc., that supports the containers attached to the carrier 105.

Still referring to FIGS. 2-4, the front side panel 155*a* can be folded upwardly at the fold line 157*a*, for example, to be at an oblique arrangement relative to the containers CA1, CA2, CA3, CB1, CB2, CB3 and/or into at least partial face-to-face contact with the exterior marginal portion 138*a* of the attachment panel 131*a*, and the front top panel 159*a* can be folded at the fold line 161*a*. Such movement of the top panel 159*a* can cause the container retention tabs 148*a* to separate from the front side panel 155*a* at the respective cuts 141*a*, and can at least partially overlie the container retention tabs 148*a* associated with the attachment panel 131*a*. In this regard, the rolled rim or other top structure of the respective containers CA1, CA2, CA3 can be at least partially received through the cuts 141*a* along the fold line 161*a* such that the container retention tabs 148*a* extending from the top panel 159*a* can also sit within recessed upper portions of the containers CA1, CA2, CA3.

Similarly, the back side panel 155*b* can be folded upwardly at the fold line 157*b* into an oblique arrangement with the containers CA1, CA2, CA3, CB1, CB2, CB3 and/or into at least partial face-to-face contact with the exterior marginal portion 138*b* of the attachment panel 131*b*, and the top panel 159*b* can be folded at the fold line 161*b* into at least partial face-to-face contact with the attachment panel 131*b*. Such movement of the top panel 159*b* can cause engagement with the containers CB1, CB2, CB3 in a manner similar to that described above with regard to the engagement of the top panel 159*a* with the containers CA1, CA2, CA3.

In the illustrated embodiment, the front top panel 159*a* can ultimately be positioned in at least partial face-to-face contact over the back top panel 159*b*, though it will be understood that the front top panel 159*a* can be at least partially positioned under the back top panel 159*b* without departing from the disclosure. This positioning of the top panel 159*a* can align the handle openings 163 with the respective handle apertures 130 in the central panel 115 therebelow, as described further herein.

This disclosed arrangement of the erected carrier 105/package 110 can be maintained with an adhesive such as glue, e.g., a hot melt glue. In one embodiment, glue can be applied to an exterior surface of the blank 103/carrier 105 along a portion of the back top panel 159*b*. It will be understood that additional or alternative arrangements of glue can be applied to the blank 103/carrier 105 without departing from the disclosure. In another embodiment, the carrier 105/package 110 can be devoid of adhesive.

Accordingly, in the formed carrier 105/package 110, containers can be engaged by the respective attachment panels 131*a*, 131*b* and can extend below the respective container retention portions 135*a*. In such an arrangement, the containers CA1, CA2, CA3 extend below the container retention portion 135*a* in the front portion 106 of the carrier 105, and the containers CB1, CB2, CB3 extend below the container retention portion 135*b* in the back portion 108 of the carrier 105, with the front top panel 159*a* overlying respective portions of the attachment panels 131*a*, 131*b* and the central panel 115, and with the back top panel 159*b* overlying a portion of the back attachment panel 131*b*.

In this regard, each of the containers CA1, CA2, CA3, CB1, CB2, CB3 is engaged at multiple points and layers by the carrier 105: each container CA1, CA2, CA3 is at least partially received through the cuts 141*a*/openings 142*a* of the attachment panel 131*a* so as to be in engagement with respective edges and surfaces associated therewith as well as being received through the cuts 141*a* in the front side panel 155*a*/top panel 159*a* so as to be in engagement with respective edges and surfaces associated therewith; and each container CB1, CB2, CB3 is at least partially received through the cuts 141*b*, openings 142*b* of the attachment panel 131*b* so as to be in engagement with respective edges and surfaces associated therewith as well as being received through the cuts 141*b* in the front side panel 155*b*/top panel 159*b* so as to be in engagement with respective edges and surfaces associated therewith.

Such a multi-ply, e.g., two ply, clipping engagement of the carrier 105 with the containers provides a reinforced arrangement that secures the containers to the carrier 105 and resists unwanted or unintentional disengagement of containers from the carrier 105.

Furthermore, the row of containers CA1, CA2, CA3 in the front portion 106 of the carrier 105/package 110 and the row of containers CB1, CB2, CB3 in the back portion 108 of the carrier 105/package 110 are joined the engagement of the top panels 159*a*, 159*b* and the connection portion 117 of the central panel 115, but are separated therebelow so as to be free to tilt, swing, or otherwise move relative to one another. Owing to the two-ply clipping engagement of the carrier 105 with the containers, the carrier 105 minimizes/resists/avoids/prevents inadvertent or unwanted disengagement of the containers from the carrier 105 due to incidental movement of the containers during transportation, carrying, etc. of the carrier 105/package 110.

Still referring to FIGS. 2-4, the carrier 105 can be grasped by inserting a user's fingers through the handle openings 163 and into the handle apertures 130 below to facilitate contact by the user's fingers of the underside of the connection portion 117 of the central panel 115. Such engagement of the carrier 105 by the user can cause one or both of the handle reinforcement flaps 165 to fold downwardly at the respective longitudinal fold lines 167 to provide one or more additional plies of material between the user's fingers and the underside of the top panel 159*a*, e.g., for strengthening the carrier 105 at stress points, for comfort, to avoid pinching, etc. and/or to provide a reinforced structure for engagement by the user that is resistant to tearing or other deformation due to carrying stresses.

In one embodiment, movement of the user's fingers through the handle openings 163/handle apertures 130 can cause longitudinally adjacent containers to tilt away from one another to provide additional clearance for the user's fingers. In another embodiment, portions of the central panel 115 exposed through the handle openings 163/handle apertures can be provided with printed graphics or indicia so as to coordinate with an overall aesthetic of the carrier 105/package 110, to provide advertising or pricing information, etc.

The package 110/carrier 105 described above has a compact structure that can, for example, provide materials savings and waste reduction, e.g., by minimizing an amount of adhesive required to form/maintain the erected configuration of the carrier 105/package 110 and the engagement of the container therewith. Further, the exposure of one or more portions of the containers CA1, CA2, CA3, CB1, CB2, CB3 on exterior portions of the carrier 105/package 110 provides a consumer with a clear view of labeling or surface graphics associated with the containers CA1, CA2, CA3, CB1, CB2, CB3 as well as providing convenient access to remove one or more of the containers CA1, CA2, CA3, CB1, CB2, CB3 from the carrier 105/package 110, for example, by withdrawing a respective container through the respective cuts 141*a*, 141*b*/openings 142*a*, 142*b* to disengage the container from the respective panel 159*a*, 159*b*, 131*a*, 131*b*.

Figure 5:
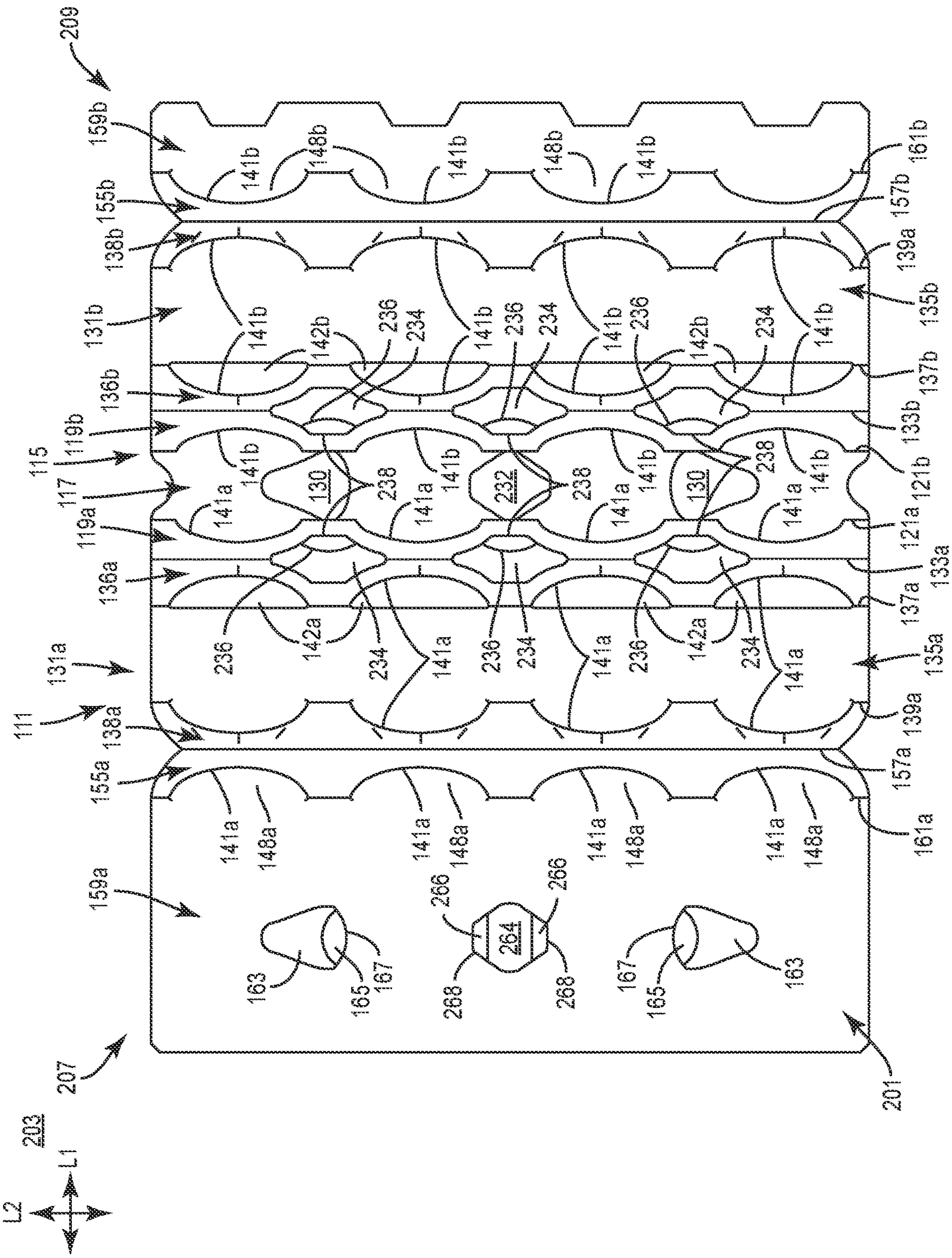
FIG. 5 is a plan view of an outer surface of a blank for forming a carrier and package according to a second exemplary embodiment of the disclosure.
Figure 6:
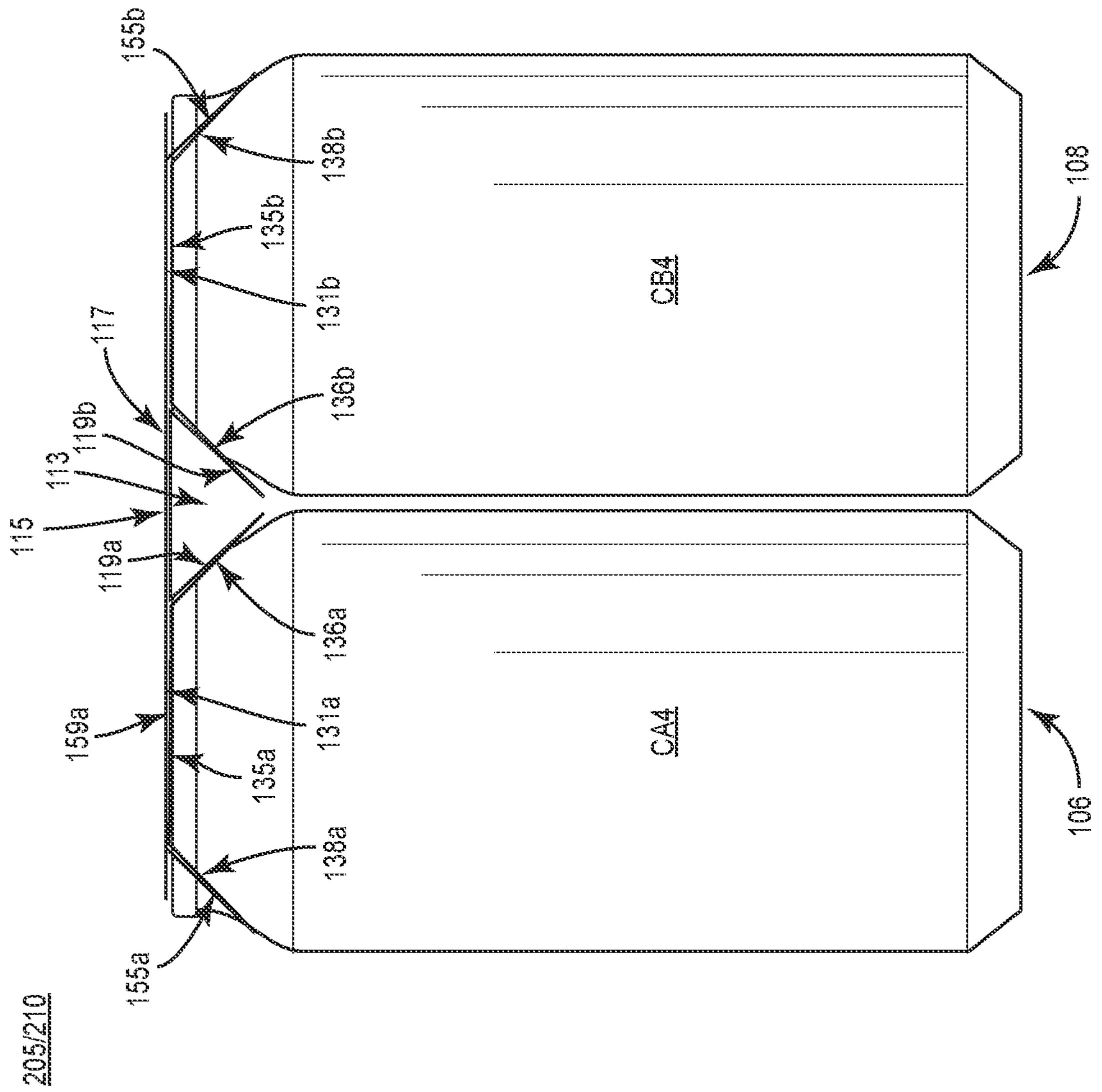
FIG. 6 is a side view of a package and carrier formed from the blank of FIG. 5 according to the second exemplary embodiment.

Turning to FIG. 5, a plan view of an exterior surface 201 of a blank 203 for forming a carrier 205 (FIG. 6) according to a second exemplary embodiment of the disclosure is illustrated. The blank 203 and carrier 205 formed therefrom can have one or more features that are the same or similar to those described above with respect to the blank 103 and carrier 105, and like or similar features are designated with like or similar reference numerals. The carrier 205 can be provided with one or more containers to form a package 210 (FIG. 6).

As shown in FIG. 5, the blank 203 can include a front portion 207 for forming a front portion 206 of the carrier 205, a back portion 209 for forming a back portion 208 of the carrier 205, and a central portion 211 extending from the front portion 207 to the back portion 209 of the blank 203 for forming a central portion or connection portion 213 of the carrier 205 that extends from the front portion 206 to the back portion 208 of the carrier 205.

As shown, the blank 203 and the carrier 205 formed therefrom can include the central panel 115, the attachment panels 131*a*, 131*b*, the side panels 155*a*, 155*b*, and the top panels 159*a*, 159*b* and associated features. In this regard, the front portion 207 of the blank 203/front portion 206 of the carrier 205, the back portion 209 of the blank 203/back portion 208 of the carrier 205, and the central portion 211 of the blank 203/central portion 213 of the carrier 205, can be generally similar to the respective front portions 107, 106, back portions 109, 108, and central portions 211, 213 described above.

The blank 203 and carrier 205 formed therefrom can also be configured to accommodate a different number and/or arrangement of containers. For example, the blank 203 and carrier 205 can be configured to accommodate two rows of four containers, e.g., such that a front portion 207 of the blank 203/front portion 206 of the carrier 205 can be configured to at least partially receive and retain four containers and such that a back portion 207 of the blank 203/back portion 208 of the carrier 205 can be configured to at least partially receive and retain four containers. It will be understood that the blank 203 and carrier 205 can be configured to receive and retain a greater or lesser number of containers and/or in different arrangements.

With continued reference to FIG. 5, the blank 203 and carrier 205 formed therefrom can have a different number and/or arrangement of handle features without departing from the disclosure.

The blank 203 and carrier 205 can have the handle apertures 130, the handle openings 163, and the handle reinforcement flaps 165 and associated features.

A central handle aperture 232 can be positioned between the handle apertures 130 (broadly, "first handle apertures") in the central panel 115, and respective pairs of laterally-spaced apertures 234 (broadly, "second handle apertures") can be positioned longitudinally adjacent each handle aperture 130, 232. The apertures 234, as shown, can at least partially interrupt the respective fold lines 133*a*, 133*b* so that the apertures 234 interrupting the fold line 133*a* are positioned extending into respective portions of the central panel 115 and the front attachment panel 131*a*, and such that the apertures 234 interrupting the fold line 133*b* are positioned extending into respective portions of the central panel 115 and the back attachment panel 131*b*.

Respective handle reinforcement flaps 236 can also be positioned extending into the handle opening 234 and foldably connected to the central panel 115 at respective lateral fold lines 238.

The top panel 259*a*, as shown, can also include a central handle opening 264 positioned between the handle openings 163, and can include a pair of opposed handle reinforcement flaps 266 foldably connected to the top panel 159*a* at respective lateral fold lines 268.

With additional reference to FIG. 6, the carrier 205 and package 210 can be formed from the blank 203 in a manner similar to that described above with respect to the carrier 105 and package 110, and providing similar advantages thereto.

Upon overlapping the top panel 159*a* upon respective portions of the front attachment panel 131*a* and central panel 115 as described above, the handle openings 163 and handle apertures 130 can align in the manner described above, and the handle opening 264 can align with the handle aperture 232. Accordingly, in addition to the aligned openings 163/apertures 130, a user can insert one or more of his or her fingers into the handle opening 264 and further through the handle aperture 232 aligned therebelow to grasp, for example, an underside of one or more portions of the central panel 115 adjacent the handle aperture 232. Such engagement of the aligned opening 264/aperture 232 can cause one or both of the handle reinforcement flaps 266 to fold downwardly at the respective fold lines 268 and become positioned between the user's finger(s) and the underside of the central panel 115, e.g., for strengthening of the carrier 205 at stress points, for comfort, to avoid pinching, etc.

Furthermore, the presence of the respective apertures 234 adjacent the aligned handle openings 163, 264/handle apertures 130, 232 can permit the user to reorient his or her grip on the underside of the carrier 205, for example, by curling his or her finger(s) along the edges of respective opening 163, 264/aperture 130, 232 in the direction of a respective aperture 234 to facilitate accessing a different surface on the underside of the carrier 205. Such movement of a user's finger(s) through a respective aperture 234 can cause a respective handle reinforcement flap 236 to fold downwardly at a respective fold line 238 and become positioned between the user's finger(s) and the underside of a respective panel, e.g., for strengthening of the carrier 205 at stress points, for comfort, to avoid pinching, etc.

It will be understood that the blanks and carriers described herein can be provided in different configurations without departing from the disclosure.

In general, the blank may be constructed from paperboard having a caliper so that it is heavier and more rigid than ordinary paper. The blank can also be constructed of other materials, such as cardboard, or any other material having properties suitable for enabling the carrier to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the carrier embodiments. The term "glue" is intended to encompass all manner of adhesives commonly used to secure carrier panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carrier for holding a plurality of containers, the carrier comprising:

a front portion comprising a front attachment panel for at least partially receiving a respective container of the plurality of containers;

a back portion comprising a back attachment panel for at least partially receiving a respective container of the plurality of containers; and a central portion extending from the front portion to the back portion, the central portion comprising a central panel in at least partial face-to-face contact with a respective portion of each of the front attachment panel and the back attachment panel, the central panel is foldably connected to each of the front attachment panel and the back attachment panel.

2. A carrier for holding a plurality of containers, the carrier comprising:

a front portion comprising a front attachment panel for at least partially receiving a respective container of the plurality of containers;

a back portion comprising a back attachment panel for at least partially receiving a respective container of the plurality of containers; and a central portion extending from the front portion to the back portion, the central portion comprising a central panel foldably connected to each of the front attachment panel and the back attachment panel and overlapping a respective portion of each of the front attachment panel and the back attachment panel, wherein the central panel comprises a connection portion foldably connected to each of a front reinforcement portion and a back reinforcement portion.

3. The carrier of claim 2, wherein the front reinforcement portion is foldably connected to the front attachment panel and the back reinforcement portion is foldably connected to the back attachment panel.

4. The carrier of claim 3, wherein the front attachment panel comprises an attachment portion, an interior marginal portion foldably connected to the attachment portion, and an exterior marginal portion foldably connected to the attachment portion, the front reinforcement portion of the central panel is foldably connected to and in at least partial face-to-face contact with the interior marginal portion of the front attachment panel.

5. The carrier of claim 4, wherein the front attachment panel comprises at least one curved cut for at least partially receiving a respective container of the plurality of containers and at least one opening for at least partially receiving the respective container of the plurality of containers.

6. The carrier of claim 4, wherein each of the interior marginal portion of the front attachment panel and the exterior marginal portion of the front attachment panel are obliquely arranged relative to the attachment portion of the front attachment panel.

7. The carrier of claim 4, wherein the back attachment panel comprises an attachment portion, an interior marginal portion foldably connected to the attachment portion of the back attachment panel, and an exterior marginal portion foldably connected to the attachment portion of the back attachment panel, the back reinforcement portion of the central panel is foldably connected to and in at least partial face-to-face contact with the interior marginal portion of the back attachment panel.

8. The carrier of claim 3, further comprising at least one top panel in at least partial face-to-face contact with the central panel.

9. The carrier of claim 8, further comprising a front side panel foldably connected to the front attachment panel and a back side panel foldably connected to the back attachment panel, wherein the at least one top panel is a front top panel foldably connected to the front side panel and the carrier further comprises a back top panel foldably connected to the back side panel, the front top panel positioned in at least partial face-to-face contact with the back top panel.

10. The carrier of claim 8, further comprising handle features, the handle features comprising at least one handle opening in the at least one top panel and aligned with at least one handle aperture in the central panel.

11. The carrier of claim 10, wherein the at least one handle aperture is at least one first handle aperture in the central panel, the handle features further comprise at least one second handle aperture in the central panel, the at least one second handle aperture in the central panel positioned longitudinally adjacent the at least one first handle aperture in the central panel.

12. A blank for forming a carrier for holding a plurality of containers, the blank comprising:

a front portion comprising a front attachment panel for at least partially receiving a respective container of the plurality of containers;

a back portion comprising a back attachment panel for at least partially receiving a respective container of the plurality of containers; and a central portion extending from the front portion to the back portion, the central portion comprising a central panel for being positioned in at least partial face-to-face contact with a respective portion of each of the front attachment panel and the back attachment panel when the carrier is formed from the blank, the central panel is foldably connected to each of the front attachment panel and the back attachment panel.

13. A blank for forming a carrier for holding a plurality of containers, the blank comprising:

a front portion comprising a front attachment panel for at least partially receiving a respective container of the plurality of containers;

a back portion comprising a back attachment panel for at least partially receiving a respective container of the plurality of containers; and a central portion extending from the front portion to the back portion, the central portion comprising a central panel foldably connected to each of the front attachment panel and the back attachment panel, the central panel for overlapping a respective portion of each of the front attachment panel and the back attachment panel when the carrier is formed from the blank, wherein the central panel comprises a connection portion foldably connected to each of a front reinforcement portion and a back reinforcement portion.

14. The blank of claim 13, wherein the front reinforcement portion is foldably connected to the front attachment panel and the back reinforcement portion is foldably connected to the back attachment panel.

15. The blank of claim 14, wherein the front attachment panel comprises an attachment portion, an interior marginal portion foldably connected to the attachment portion, and an exterior marginal portion foldably connected to the attachment portion, the front reinforcement portion of the central panel is foldably connected to the interior marginal portion of the front attachment panel, the front reinforcement portion of the central panel is for being positioned in at least partial face-to-face contact with the interior marginal portion of the front attachment panel when the carrier is formed from the blank.

16. The blank of claim 15, wherein the front attachment panel comprises at least one curved cut for at least partially receiving a respective container of the plurality of containers and at least one opening for at least partially receiving the respective container of the plurality of containers.

17. The blank of claim 15, wherein the back attachment panel comprises an attachment portion, an interior marginal portion foldably connected to the attachment portion of the back attachment panel, and an exterior marginal portion foldably connected to the attachment portion of the back attachment panel, the back reinforcement portion of the central panel is foldably connected to the interior marginal portion of the back attachment panel, the back reinforcement portion of the central panel is for being positioned in at least partial face-to-face contact with the interior marginal portion of the back attachment panel when the carrier is formed from the blank.

18. The blank of claim 14, further comprising at least one top panel for being positioned in at least partial face-to-face contact with the central panel when the carrier is formed from the blank.

19. The blank of claim 18, further comprising a front side panel foldably connected to the front attachment panel and a back side panel foldably connected to the back attachment panel, wherein the at least one top panel is a front top panel foldably connected to the front side panel and the blank further comprises a back top panel foldably connected to the back side panel, the front top panel for being positioned in at least partial face-to-face contact with the back top panel when the carrier is formed from the blank.

20. The blank of claim 18, further comprising handle features, the handle features comprising at least one handle opening in the at least one top panel and for being aligned with at least one handle aperture in the central panel when the carrier is formed from the blank.

21. The blank of claim 20, wherein the at least one aperture is at least one first handle aperture in the central panel, the handle features further comprise at least one second handle aperture in the central panel, the at least one second handle aperture in the central panel positioned longitudinally adjacent the at least one first handle aperture in the central panel.

22. A method of forming a carrier for holding a plurality of containers, the method comprising:

obtaining a blank comprising a front portion comprising a front attachment panel, a back portion comprising a back attachment panel, and a central portion for extending from the front portion to the back portion;

positioning the front attachment panel for at least partially receiving a respective container of the plurality of containers;

positioning the back attachment panel for at least partially receiving a respective container of the plurality of containers; and positioning the central panel in at least partial face-to-face contact with a respective portion of each of the front attachment panel and the back attachment panel, the central panel is foldably connected to each of the front attachment panel and the back attachment panel.

23. A method of forming a carrier for holding a plurality of containers, the method comprising:

obtaining a blank comprising a front portion comprising a front attachment panel, a back portion comprising a back attachment panel, and a central portion for extending from the front portion to the back portion the central portion comprises a central panel foldably connected to each of the front attachment panel and the back attachment panel, wherein the central panel comprises a connection portion foldably connected to each of a front reinforcement portion and a back reinforcement portion;

positioning the front attachment panel for at least partially receiving a respective container of the plurality of containers;

positioning the back attachment panel for at least partially receiving a respective container of the plurality of containers; and positioning the central panel overlapping a respective portion of each of the front attachment panel and the back attachment panel.

24. The method of claim 23, wherein the front reinforcement portion is foldably connected to the front attachment panel and the back reinforcement portion is foldably connected to the back attachment panel.

25. The method of claim 24, wherein the front attachment panel comprises an attachment portion, an interior marginal portion foldably connected to the attachment portion, and an exterior marginal portion foldably connected to the attachment portion, the front reinforcement portion of the central panel is foldably connected to the interior marginal portion of the front attachment panel and the method further comprises positioning the front reinforcement portion of the central panel in at least partial face-to-face contact with the interior marginal portion of the front attachment panel.

26. The method of claim 25, wherein the front attachment panel comprises at least one curved cut for at least partially receiving a respective container of the plurality of containers and at least one opening for at least partially receiving the respective container of the plurality of containers.

27. The method of claim 25, wherein the method comprises positioning each of the interior marginal portion of the front attachment panel and the exterior marginal portion of the front attachment panel obliquely arranged relative to the attachment portion of the front attachment panel.

28. The method of claim 25, wherein the back attachment panel comprises an attachment portion, an interior marginal portion foldably connected to the attachment portion of the back attachment panel, and an exterior marginal portion foldably connected to the attachment portion of the back attachment panel, the back reinforcement portion of the central panel is foldably connected to the interior marginal portion of the back attachment panel, and the method further comprises positioning the back reinforcement portion of the central panel in at least partial face-to-face contact with the interior marginal portion of the back attachment panel.

29. The method of claim 24, wherein the blank comprises at least one top panel and the method further comprises positioning the at least one top panel in at least partial face-to-face contact with the central panel.

30. The method of claim 29, further comprising a front side panel foldably connected to the front attachment panel and a back side panel foldably connected to the back attachment panel, wherein the at least one top panel is a front top panel foldably connected to the front side panel and the carrier further comprises a back top panel foldably connected to the back side panel, and the method further comprises positioning the front top panel in at least partial face-to-face contact with the back top panel.

31. The method of claim 29, further comprising handle features, the handle features comprising at least one handle opening in the at least one top panel and at least one handle aperture in the central panel, and the method further comprises aligning the at least one handle opening with the at least one handle aperture.

32. The method of claim 31, wherein the at least one handle aperture is at least one first handle aperture in the central panel, the handle features further comprise at least one second handle aperture in the central panel, the at least one second handle aperture in the central panel positioned longitudinally adjacent the at least one first handle aperture in the central panel.

33. A package, the package comprising:

a plurality of containers; and a carrier holding the plurality of containers, the carrier comprising:

a front portion comprising a front attachment panel at least partially receiving a respective container of the plurality of containers;

a back portion comprising a back attachment panel at least partially receiving a respective container of the plurality of containers; and a central portion extending from the front portion to the back portion, the central portion comprising a central panel in at least partial face-to-face contact with a respective portion of each of the front attachment panel and the back attachment panel, the central panel is foldably connected to each of the front attachment panel and the back attachment panel.

34. A package, the package comprising:

a plurality of containers; and a carrier holding the plurality of containers, the carrier comprising:

a front portion comprising a front attachment panel at least partially receiving a respective container of the plurality of containers;

a back portion comprising a back attachment panel at least partially receiving a respective container of the plurality of containers; and a central portion extending from the front portion to the back portion, the central portion comprising a central panel foldably connected to each of the front attachment panel and the back attachment panel and overlapping a respective portion of each of the front attachment panel and the back attachment panel, wherein the central panel comprises a connection portion foldably connected to each of a front reinforcement portion and a back reinforcement portion.

35. The package of claim 34, wherein the front reinforcement portion is foldably connected to the front attachment panel and the back reinforcement portion is foldably connected to the back attachment panel.

36. The package of claim 35, wherein the front attachment panel comprises an attachment portion, an interior marginal portion foldably connected to the attachment portion, and an exterior marginal portion foldably connected to the attachment portion, the front reinforcement portion of the central panel is foldably connected to and in at least partial face-to-face contact with the interior marginal portion of the front attachment panel.

37. The package of claim 36, wherein the front attachment panel comprises at least one curved cut at least partially receiving a respective container of the plurality of containers and at least one opening at least partially receiving the respective container of the plurality of containers.

38. The package of claim 36, wherein each of the interior marginal portion of the front attachment panel and the exterior marginal portion of the front attachment panel are obliquely arranged relative to the attachment portion of the front attachment panel.

39. The package of claim 36, wherein the back attachment panel comprises an attachment portion, an interior marginal portion foldably connected to the attachment portion of the back attachment panel, and an exterior marginal portion foldably connected to the attachment portion of the back attachment panel, the back reinforcement portion of the central panel is foldably connected to and in at least partial face-to-face contact with the interior marginal portion of the back attachment panel.

40. The package of claim 35, further comprising at least one top panel in at least partial face-to-face contact with the central panel.

41. The package of claim 40, further comprising a front side panel foldably connected to the front attachment panel and a back side panel foldably connected to the back attachment panel, wherein the at least one top panel is a front top panel foldably connected to the front side panel and the carrier further comprises a back top panel foldably connected to the back side panel, the front top panel positioned in at least partial face-to-face contact with the back top panel.

42. The package of claim 40, further comprising handle features, the handle features comprising at least one handle opening in the at least one top panel and aligned with at least one handle aperture in the central panel.

43. The package of claim 42, wherein the at least one handle aperture is at least one first handle aperture in the central panel, the handle features further comprise at least one second handle aperture in the central panel, the at least one second handle aperture in the central panel positioned longitudinally adjacent the at least one first handle aperture in the central panel.

* * * * *